United States Patent Office 3,168,139
Patented Feb. 2, 1965

3,168,139
CONVERTING DRILLING MUDS TO SLURRIES SUITABLE FOR CEMENTING OIL AND GAS WELLS
Harvey T. Kennedy and Paul B. Crawford, Bryan, and James T. Hancock, Jr., Houston, Tex., assignors to Great Lakes Carbon Corporation, New York, N.Y., a corporation of Delaware
No Drawing. Filed May 8, 1961, Ser. No. 108,279
10 Claims. (Cl. 166—29)

This invention relates to a process of and materials for cementing oil and gas wells, usually and preferably for the purpose of securing pipe in place in the well, and shutting off undesirable fluids which might otherwise enter the well. More particularly, the invention relates to a process which comprises employing a drilling fluid, preferably that with which the well has been drilled, as a component of the slurry used to cement the well. The invention also relates to novel slurry compositions of which the drilling fluid is an essential component.

Several functions are accomplished by the cementitious material placed in the annular space between a well casing and the well bore. Perhaps the primary function is to form a permanent seal to prevent fluids in upper strata behind the casing from travelling downward around the bottom of the casing and into the well. Other functions include protecting the casing, where cemented, against collapse due to external pressures, preventing migration of fluids from one stratum to another, and preventing blowouts from high pressure gas behind the casing. Cement is usually also placed in a portion of the open hole below the casing, and this is for the purpose of shutting off water coming from the bottom of the well or from some intermediate stratum below the bottom of the casing.

Drilling fluids are required for drilling wells by the so-called rotary method. They are circulated down the drill-stem and up the annulus between the drill-stem and the wall of the hole to carry out the drilling chips, to cool and lubricate the bit and to prevent the escape of water, oil or gas from the formations penetrated by the drill. In order that these functions may be carried out, a drilling fluid must have a viscosity which will allow it to be circulated at high rates without excessive pump pressure and also a density such that the pressure of all deposits of water, oil and gas will be more than counter-balanced by the hydrostatic head of drilling fluid in the hole. Such fluids must also have a colloidal nature that will prevent water loss and thereby prevent any substantial filtering out of their contained solids on the wall of the drilled hole, thus avoiding their accumulation, with subsequent sticking or freezing of the drill stem and bit in the hole.

The properties required in a drilling fluid for proper performance are obtained by constant additions of various materials as the drilling of a well progresses. Weighting material, such as finely powdered barium sulfate, is added to provide increased weight over that obtained from the distintegrated clays and shales which are naturally added during the drilling process. Tannins, or tannin-containing extracts are added along with alkaline compounds, to lower the fluid's viscosity. Colloidal substances such as starch, bentonite, gums or carboxy-methyl-cellulose, are employed to reduce the tendency of the fluid to form a thick filter-cake on the wall of the hole. In addition, water is added almost constantly in order to compensate partially for the filtrate lost to the formation by filtration and for the solids added by drilling.

In cementing a well after it is drilled to the desired depth, it is present practice to mix water with Portland cement, frequently with the further addition of a retarder or an accelerator to obtain the desired setting time, and to pump the slurry down the string of pipe and up the annular space between the string of pipe and the walls of the drilled borehole. Numerous additions of a colloidal nature, whose function is to prevent excessive filtration or water loss and cake formation on the wall of the hole, have been proposed. Further, bentonite is frequently added for its colloidal properties and for its extending and suspending action where, as is usually the case, the greater strength of neat cement slurries is not required.

It is a finding of this invention that cementing slurries effective for the purpose of securing pipe in place in a well, as well as for other purposes, can be made from mixtures of cement and drilling fluids, if one proceeds in accordance with teachings of this invention. The drilling fluid is preferably the fluid with which the well to be cemented was drilled.

The advantages of this invention over present practice include the utilization of valuable collodial material contained in the drilling fluid, which is otherwise discarded, as well as the provision of better colloidal properties than is normally obtainable in a cement mixture. Such improved colloidal properties result from the extended period of hydration and deflocculation available while the drilling fluid is circulated, compared with perhaps an hour available when colloidal material is added to a cement slurry in the usual manner.

Another advantage of the process of this invention is that wells that require heavy drilling fluids generally also require heavy cement slurries, and that this density requirement may frequently be met by using the fluid as a constituent of the slurry as described herein. In such cases, the cost of extra weighting material, as well as that of colloidal matter, is saved.

Still another advantage of this process is that the better dispersed colloidal matter obtainable from the drilling fluid gives less fluid loss from the cementing slurry to the wall of the hole. This also results in less chance of premature setting because of dehydrated cement.

A further advantage results from the fact that mud pumps are available and already connected up to take the drilling fluid from the pits containing it. This effects a considerable saving in time and expense in carrying out the cementing process.

In some off shore and desert locations, there is a still further need for the process of this invention, since water of the quality needed for cementing may not be available.

In all cases, a troublesome problem of the disposal of the drilling fluid is solved.

The manner in which the invention is best carried out depends on a number of factors such as the type of drilling fluid which is to be converted, the strength of the "set" cement desired or required, the temperature encountered in the area where the cementing slurry is placed, the time available or required for the slurry to "set," etc.

The drilling fluids which are employable in the preparation of the slurries of this invention normally comprise mixtures of natural clays, shales and sandstone ground up by the drill, together with residues of tannins, caustic soda and clayey and other colloidal material which have been added and not entirely lost during the process of drilling. The major types of drilling muds, including fresh-water muds, salt-water muds, calcium-treated muds, oil-emulsion muds, oil base muds and sodium silicate muds, may all be used.

Unless information, such as is based on the examples of this application, or experience in cementing nearby wells using the same type of drilling fluid is available, it is generally necessary to take a sample of fluid from the mud stream, after thorough mixing by means of the mud pumps, and to mix the mud with cement, water and perhaps other additives as described later in this disclosure, and determine the pumpable time and the properties of the set cement. This can best be done by employing a viscometer such as described in U.S. Patent 2,957,338, and removing a portion of the fluid just before the mixture sets. Upon aging the portion at the proper temperature, the strength at any time may be determined.

The following examples which give additional details on various compositions and properties of drilling muds and showing the preparation of suitable cementing slurries from various drilling fluids and the setting or curing of same will further illustrate the teachings of this invention. The test data cited in these examples were obtained by methods customarily used in the oil industry, which are described in reports of the American Petroleum Institute and the American Society for Testing Materials.

*Example 1*

A well was drilled to a depth of 9600 feet in Vermillion Parish, Louisiana, with the aid of a drilling fluid or a drilling mud. Carboxy-methyl-cellulose, lignite, diesel oil, barium sulfate, bentonite, caustic soda and gypsum were materials used as parts of the drilling mud during the drilling process. These materials were employed in such amounts or ratios as 2 sacks of the carboxy-methyl-cellulose, 4 sacks of the lignite, 6 barrels of the diesel oil and in excess of 5 sacks of gypsum etc., the weight of the sacks of materials varying but generally being between about 60 and about 100 pounds. Employment of gypsum in this drilling fluid made it a "gyp-type" mud, which type mud is particularly susceptible to conversion into a slurry suitable for cementing oil and gas wells in accordance with the teachings of this invention. This drilling fluid or mud also possessed the following characteristics:

| | |
|---|---|
| Solids, percent (by weight) | 44.4 |
| Weight, lbs./gallon | 11.4 |
| Marsh funnel viscosity (1500 cc. in, 1 qt. out), sec. | 45 |
| Gel strength | 0 |
| API filtrate, cc. | 5.5 |
| Cake thickness, inches | 2/32 |
| pH | 9.5 |
| Gypsum, lbs./barrel | 3.5 |
| Cl ion, p.p.m. | 1400 |
| Ca ion, p.p.m. | 1000 |
| Oil, percent by vol. | 10 |

When 5 sacks (470 lbs.) of cement were added to and mixed with the above drilling mud along with 19 gallons of water and 5 pounds of calcium sulfate (anhydrous) per barrel of mud, a compressive strength of 580 p.s.i. developed on curing for 24 hours at 100° F.

*Example 2*

The conversion of the drilling mud of Example 1 was repeated employing 10 pounds of calcium chloride per barrel of mud in the place of the 5 pounds of calcium sulfate. A compressive strength of 400 p.s.i. was obtained.

*Example 3*

The conversion of the drilling mud of Example 1 was repeated employing 5 pounds of sodium metasilicate per barrel of mud in the place of the 5 pounds of calcium sulfate. A compressive strength of 460 p.s.i. was obtained.

*Example 4*

The conversion of the drilling mud of Example 1 was repeated with the substitution of 5 pounds of $Al_2(SO_4)_3$ in the place of the 5 pounds of calcium sulfate. A compressive strength of 380 p.s.i. was obtained.

When no additive was employed, a compressive strength of 210 p.s.i. was developed under the same conditions as set forth in the foregoing examples, and of 290 p.s.i. at 140° F., which strengths are more than sufficient for most of the purposes of this invention such as securing a string of pipe in place in a borehole. The employment of oxidizers such as sodium dichromate or calcium hypochlorite in the place of the additives previously discussed has also been found to be effective in enhancing the compressive strength properties of the slurry of Example 1.

It was also determined that the drilling fluid of Example 1 could be converted into a satisfactory slurry which would develop a compressive strength of 210 p.s.i. by adding 3 sacks of cement along with 5 gallons of water and 2.5 gallons of Brand D sodium silicate as defined hereinafter per barrel of mud and curing same for 24 hours at 140° F.; or one which would develop a compressive strength of 140 p.s.i. by adding 2 sacks of cement along with 3 gallons of water and 2.5 gallons of Brand D sodium silicate per barrel of mud and curing same for 24 hours at 180° F.

*Example 5*

A well was drilled to a depth of 13,477 feet in Cameron Parish, Louisiana, with the aid of a drilling fluid or a drilling mud. During the drilling process, the fluid had additions of barium sulfate, bentonite, clay, caustic soda, carboxy-methyl-cellulose, oil, walnut hulls and mica flakes. It also had been converted into a "gyp-base" fluid by the addition of an excess of gypsum. This drilling fluid also possessed the following characteristics:

| | |
|---|---|
| Solids, percent by weight | 65.1 |
| Solids, percent by volume | 28 |
| Weight, lbs./gallon | 14.5 |
| Marsh funnel viscosity (1500 cc. in, 1 qt. out), sec. | 54 |
| Viscosity, centipoises | 52 |
| Gel strength, 10 minutes | 3 |
| pH | 10.0 |
| API filtrate, cc. | 3.3 |
| Cake thickness, inches | 2/32 |
| Gypsum, lbs./barrel | 6.4 |
| Ca, p.p.m. | 1040 |
| Oil, percent by volume | 10 |

When 5 sacks of cement were added to and mixed with the above drilling mud, along with 30 gallons of water and 1.25 gallons of grade D sodium silicate per barrel of mud, a compressive strength of 720 p.s.i. developed on curing for 24 hours at 100° F. The sodium silicate employed was the Philadelphia Quartz Company's Brand D® sodium silicate solution having an alkali-silica ratio of approximately 1:2.00, a gravity of 50.5 degrees Baumé (50.5° Bé.), and a viscosity of 3.5 poises. The use of 3 sacks of cement, 2.5 gallons of the grade D sodium silicate and 27 gallons of water per barrel of mud resulted in a compressive strength of 270 p.s.i. on curing for 24 hours at 140° F. Two sacks of cement, 2.5 gallons of the same sodium silicate and 7 gallons of water per barrel of mud resulted in a compressive strength of 250 p.s.i. on curing for 24 hours at 180° F.

*Example 6*

The conversion of the drilling mud of Example 5 was repeated employing 5 sacks of cement, 17.5 gallons of water and 5 pounds of sodium metasilicate per barrel of mud. A compressive strength of 390 p.s.i. developed on curing for 24 hours at 100° F. The same slurry, without any sodium metasilicate added, developed a compressive strength of 165 p.s.i.

*Example 7*

The conversion of the drilling mud of Example 5 was repeated employing 5 sacks of cement, 21 gallons of water, and 10 pounds of sodium metasilicate per barrel of mud. A compressive strength of 980 p.s.i. was obtained.

Example 8

The conversion of the drilling mud of Example 5 was repeated employing 5 sacks of cement, 21 gallons of water and 3.1 gallons of grade N sodium silicate per barrel of mud. A compressive strength of 740 p.s.i. was obtained. The sodium silicate employed was the Philadelphia Quartz Company's Brand N sodium silicate, ratio 1($Na_2O$):3.22($SiO_2$) used as 41.0° Bé. solution Sodium dichromate was also found to be effective in enhancing the compressive strength properties of the slurry of Example 5.

Example 9

A well was drilled to a depth of 8,705 feet in Hardin County, Texas, with the aid of a drilling fluid. During the drilling process, the fluid had additions of various amounts of phosphates, quebracho (about 150 lbs.) and carboxy-methyl-cellulose (about 50 lbs.). The drilling fluid contained no oil weighting material, lime or gypsum. This drilling fluid also possessed the following characteristics:

| | |
|---|---:|
| Solids, percent by weight | 18.3 |
| Weight, lbs./gallon | 10.4 |
| Marsh funnel viscosity | 52 |
| Viscosity, centipoises | 38 |
| Gel strength, 10 minutes | 2 |
| pH | 9.0 |
| API filtrate, 30 min. at 100 p.s.i., cc. | 5.0 |
| Cake thickness, inches | 2/32 |
| Cl ion, p.p.m. | 1700 |
| Ca ion, p.p.m. | 0 |

When 5 sacks of Portland cement were added to and mixed with the above drilling mud, along with 25 gallons of water and 5 pounds of aluminum sulfate per barrel of mud, a compressive strength of 290 p.s.i. developed on curing for 24 hours at 100° F. Results were fairly similar when anhydrous calcium sulfate was used in the place of the aluminum sulfate. Sodium dichromate and calcium hypochlorite were also found to be effective additives to slurries of this mud. A compressive strength of about 135 p.s.i. was obtained under the same conditions with the employment of no additive.

Example 10

The conversion of the drilling mud of Example 9 was repeated employing 5 sacks of cement, 25 gallons of water, 5 pounds of calcium chloride and 5 pounds of sodium metasilicate per barrel of drilling fluid. A compressive strength of 250 p.s.i. developed on curing for 24 hours at 100° F. The employment of 10 pounds of calcium chloride rather than the above additive mixture also gave satisfactory results.

Example 11

The conversion of the drilling fluid of Example 9 was repeated using 5 sacks of cement, 25 gallons of water and 5 pounds of sodium metasilicate per barrel of drilling mud. A compressive strength of 210 p.s.i. developed on curing for 24 hours at 100° F.

A minimum satisfactory compressive strength for the purposes of this invention is approximately 100 p.s.i. and the strengths, therefore, obtained by the slurries of Examples 6, 9, 10 and 11 etc. are ample.

Example 12

A well was drilled to a depth of 9200 feet in Jefferson County, Texas, with the aid of a drilling mud. During the drilling process the fluid had additions of 250 pounds of tannis, 300 pounds of caustic soda, 300 pounds of quebracho, 15 barrels of diesel oil, 5 sacks of fillers, 5 sacks of Tuf-Plug and some lime. This drilling fluid also possessed the following characteristics:

| | |
|---|---:|
| Solids, percent by weight | 48.6 |
| Solids, content by volume, percent | 21 |
| Weight, lbs./gallon | 13.0 |
| Marsh funnel viscosity | 72 |
| Viscosity, centipoises | 43.5 |
| Gel strength, 10 minutes | 14 |
| pH | 12.5 |
| API filtrate, 30 minutes at 100 p.s.i., cc. | 4.4 |
| Cake thickness, inches | 2/32 |
| Cl ion, p.p.m. | 1400 |
| Oil content by volume | 10 |

It was found that the above drilling fluid could be converted into a desirable cementing slurry by adding and mixing 5 sacks of Portland cement, 23.5 gallons of water and 5 pounds of sodium silicate with each barrel of the drilling mud, along with sufficient sodium bicarbonate to give the slurry a pH of 10. The slurry after curing for 24 hours at a temperature of 100° F. had a compressive strength of 545 p.s.i. A satisfactory slurry is also obtained under these conditions without employing the sodium silicate and the sodium bicarbonate additives.

Example 13

The conversion of the drilling mud of Example 12 was repeated employing 5 sacks of cement, 17 gallons of water and 5 pounds of aluminum sulfate per barrel of drilling mud. No sodium bicarbonate was employed. A compressive strength of 385 p.s.i. developed on curing for 24 hours at 100° F. The substitution of 5 pounds of anhydrous calcium sulfate for the aluminum sulfate resulted in a compressive strength of 340 p.s.i. and the substitution of 10 pounds of calcium chloride gave a compressive strength of 350 p.s.i.

Example 14

The drilling mud of Example 12 was converted in a manner identical to that example, except that no sodium silicate was employed. A compressive strength of 345 p.s.i. was obtained. The conversion may also be effectively carried out by employing sodium silicate alone without the sodium bicarbonate.

Hydrochloric acid and monosodium phosphate are examples of other materials which may also be used to lower the pH of the drilling mud or of the slurries.

Example 15

A well was drilled to a depth of 12,870 feet in Osson, Louisiana, with the aid of a drilling fluid. During the drilling process, the fluid had additions of 250 pounds of lime (2.3 lbs./barrel of mud), 9% by volume of diesel oil, 300 pounds of caustic, 3 sacks of fine mica and some carboxy-methyl-cellulose. This drilling fluid also possessed the following characteristics:

| | |
|---|---:|
| Solids, percent by volume | 70.3 |
| Weight, lbs./gallon | 16.3 |
| Marsh funnel viscosity | 64 |
| Viscosity, centipoises | 55 |
| API filtrate, cc. | 3 |
| Cake thickness inches | 1/32 |
| pH (Beckman) | 13.0 |
| Cl ion, p.p.m. | 2200 |

Hydrochloric acid was added to a mixture of 5 sacks of cement and 40 gallons of water per barrel of the above drilling fluid until the mixture attained a pH of 12.0 and then 6.3 pounds of a solution of D grade sodium silicate per barrel of mixture was added to and mixed with same. This slurry attained a compressive strength of 545 p.s.i. after curing for 24 hours at 100° F. A strength of 320 p.s.i. was obtained under the same conditions when 5 pounds of sodium metasilicate replaced the hydrochloric acid and the D grade sodium silicate. The employment of 5 pounds of $FeSO_4$ and 3.1 gallons of the D grade sodium silicate under the same conditions resulted in a compressive strength of 405 p.s.i.

Example 16

The conversion of the drilling mud of Example 15 was repeated by employing sodium bicarbonate in the place of the hydrochloric acid and by bringing the pH of the mixture to 10. Five pounds of sodium metasilicate per barrel of mixture was employed in the place of the D grade sodium silicate and a slurry was formed which obtained a compressive strength of 370 p.s.i. after curing for 24 hours at a temperature of 100° F. Without the sodium metasilicate, a compressive strength of 180 p.s.i. was obtained.

It was also determined that the drilling fluid of Example 16 could be converted into a satisfactory slurry which would develop a compressive strength of about 150 p.s.i. by adding 2 sacks of cement along with 8 gallons of water and 2.5 gallons of Brand D sodium silicate per barrel of mud and curing same for 24 hours at 180° F.; or one which would develop a compressive strength of 390 p.s.i. by adding 3 sacks of cement along with 10 gallons of water and 2.5 gallons of Brand D sodium silicate and curing same for 24 hours at 180° F.; or one which would develop a compressive strength of 350 p.s.i. by adding 5 sacks of cement along with 105 gallons of water and 6.3 gallons of Brand D sodium silicate and curing same for 24 hours at 140° F.

Example 17

A well in Brazoria County, Texas, was drilled to a depth of 11,000 feet using a drilling fluid or a drilling mud. During the drilling process, the fluid had additions of gypsum (5 lbs./barrel of drilling fluid), oil (13% by vol.), lignite, caustic, lime, Tuf-Plug and Mil-Mica. The drilling fluid also possessed the following characteristics:

| | |
|---|---|
| Solids, percent by vol. | 28 |
| Solids, percent by weight | 56.48 |
| Weight, lbs./gallon | 14.6 |
| Marsh funnel viscosity, sec. | 59 |
| Viscosity, centipoises | 52 |
| API filtrate, cc. | 2.1 |
| Gel strength, 10 minutes | 8 |
| Cake thickness, inches | 2/32 |
| Sand, percent by volume | 0.5 |
| pH | 10.0 |
| Cl ion, p.p.m. | 2500 |
| Ca ion, p.pm. | 960 |

When five sacks of cement were added along with 19 gallons of water and 3.1 gallons of N Brand sodium silicate per barrel of drilling fluid, a compressive strength of 780 p.s.i. developed on curing for 24 hours at 100° F. The same amount of cement along with 31.5 gallons of water and 1.25 gallons of N Brand sodium silicate resulted in a compressive strength of 535 p.s.i.

Example 18

The conversion of the drilling mud of Example 17 was repeated employing 5 sacks of cement, 18 gallons of water and 3.1 gallons of D Brand sodium silicate per barrel of mud. A compressive strength of 555 p.s.i. was obtained after curing for 24 hours at 100° F. A compressive strength of 650 p.s.i. was obtained under the same conditions when the water was increased to 34.5 gallons and the D sodium silicate was reduced to 2.5 gallons.

Satisfactory slurries were also prepared from the foregoing drilling mud when using only 3 sacks of cement and curing for 24 hours at 140° F. or 180° F.

Example 19

A well in Liberty County, Texas, was drilled to a depth of 8,920 feet with the aid of a drilling fluid. During the drilling process, the fluid had additions of gypsum, lignite, lime, diesel oil (9.0+ percent), fine mica, Tuf-Plug, and caustic. This drilling fluid also possessed the following characteristics:

| | |
|---|---|
| Solids, content by volume | 14.0 |
| Solids, content by weight | 35.6 |
| Sand content, percent | 1.5 |
| Weight, lbs./gallon | 11.4 |
| Marsh funnel viscosity, sec. | 53 |
| Viscosity, centipoises | 30 |
| Gel, 10 min. | 3 |
| API filtrate | 6.4 |
| Cake thickness, inches | 2/32 |
| pH | 9.6 |
| Ca ion, p.p.m. | 980 |
| NaCl as Cl, p.p.m. | 1800 |

When five sacks of cement were added, along with 25 gallons of water, and no additive, per barrel of drilling mud, a compressive strength of 435 p.s.i. developed on curing for 24 hours at 100° F.

Example 20

The conversion of the drilling mud of Example 19 was repeated employing 5 sacks of cement, 28 gallons of water and 5 pounds of sodium metasilicate per barrel of drilling fluid. A compressive strength of 550 p.s.i. was obtained under the same conditions. The use of grades D and N sodium silicate solutions was also effective in converting the drilling fluid of Example 19 to a cementing composition having a high compressive strength when set.

A satisfactory slurry was also prepared from the foregoing drilling mud when using only 2 sacks of cement, no additional water and 2.5 gallons of D sodium silicate per barrel of mud and curing for 24 hours at 140° F. or 180° F.

Example 21

A well was drilled to a depth of 9,518 feet in Jeff Davis County, Louisiana, using a drilling fluid or a drilling mud. During the drilling process, the fluid had additions of 15 gallons of caustic soda, 1500 pounds of lime, 750 pounds of quebracho, 8 sacks of fine mica and some carboxy-methyl-cellulose. This drilling fluid also possessed the following characteristics:

| | |
|---|---|
| Solids, content by weight | 52.0 |
| Weight, lbs./gallon | 12.1 |
| Marsh funnel viscosity | 48 |
| Viscosity, centipoises | 33.5 |
| Gel strength, 10 minutes | 3 |
| API filtrate | 4.1 |
| Cake thickness, inches | 2/32 |
| pH | 12.5 |
| Oil, percent by volume | 4.25 |
| Cl ion, p.p.m. | 2000 |
| Ca, lbs./bbl. | 5.5 |

When five sacks of cement were added, along with 37 gallons of water, 5 pounds of $FeSO_4$ and 3.1 gallons of D sodium silicate per barrel of drilling mud, a compressive strength of 470 p.s.i. developed on curing 24 hours at 100° F.

Example 22

The conversion of the drilling mud of Example 21 was repeated employing 5 sacks of cement, 46 gallons of water and 6.3 gallons of Brand D sodium silicate per barrel of drilling fluid. A compressive strength of 365 p.s.i. developed on curing for 24 hours at 180° F.

Example 23

A well was drilled to a depth of 16,434 feet in Cameron County, Louisiana, using a drilling fluid or a drilling mud. During the drilling process, the fluid had additions of barium sulfate, bentonite, clay, caustic soda, gypsum (3.3 lbs./barrel), carboxy-methyl-cellulose, oil (10% by volume), and fine mica, fine walnut hulls and fine plastic totalling approximately 2 pounds per barrel.

This drilling fluid also possessed the following characteristics:

| | |
|---|---|
| Solids, percent by vol. | 38 |
| Solids, percent by weight | 71 |
| Weight, lbs./gal. | 18.0 |
| Marsh funnel viscosity | 64 |
| Viscosity, centipoises | 73 |
| Gel strength, 10 min. | 1 |
| API filtrate, cc. | 4.2 |
| pH | 10.4 |
| Cake thickness | 2/32 |
| NcCl, p.p.m. | 9900 |
| Ca ion, p.p.m. | 1280 |

When five sacks of cement were added, along with 22.5 gallons of water, and 1.25 gallons of Brand N liquid sodium silicate per barrel of drilling fluid, a compressive strength of 710 p.s.i. developed on curing for 24 hours at 100° F. Similar results were obtained using grade D liquid sodium silicate or sodium metasilicate as the additive. Satisfactory slurries were also prepared from the foregoing drilling mud when using only 3 sacks of cement, 20 gallons of water and 2.5 gallons of D grade sodium silicate per barrel of mud and curing for 24 hours at 140° F. or 180° F.

*Example 24*

A well was drilled to a depth of 9,415 feet using a chemical emulsion type drilling fluid. During the drilling process the fluid had additions of bentonite, soda ash, caustic soda, tannin, lignite and, as needed, rice hulls and cedar in a 3:1 ratio. This drilling fluid also posssessed the following characteristics:

| | |
|---|---|
| Solids, percent by vol. | 5-8 |
| Solids, percent by weight | 28.9 |
| Weight, lbs./gal. | 9.4 |
| Marsh funnel viscosity, sec. | 77 |
| Viscosity, centipoises | 34 |
| Gel strength, initial | 3 |
| Gel strength, 10 minutes | 16 |
| pH | 8.5 |
| API filtrate, cc. | 10 |
| Cake thickness | 2/32 |
| Cl ion, p.p.m. | 1800 |
| Ca ion | Slight |
| Lime, lbs./bbl. | [1] 8 |

[1] Calculated.

When five sacks of cement were added along with 38.4 gallons of water and 5 pounds of $Al_2(SO_4)_3$ per barrel of drilling fluid, a compressive strength of 135 p.s.i. developed on curing for 24 hours at 100° F. The use of 6.3 gallons of D grade sodium silicate and 69 gallons of water in place of the above resulted in a compressive strength of 110 p.s.i. under the same conditions. The use of larger amounts of sodium silicate and of oxidizers such as sodium dichromate and calcium hypochlorite were also found to be effective in converting the above drilling fluid into a slurry which would set to a satisfactory compressive strength.

*Example 25*

A well in Cleveland County, Texas, was drilled to a depth of 7,307 feet using a drilling mud. During the drilling process, the fluid had additions of bentonite, 150 lbs. of tannins, 52 lbs. of caustic, 50 lbs. of soda ash and 15 barrels of oil. The drilling fluid also possessed the following characteristics:

| | |
|---|---|
| Solids content, percent by weight | 26.5 |
| weight, lbs./gal. | 9.75 |
| Marsh funnel viscosity, sec. | 130 |
| Viscosity, centipoises | 70 |
| Gel strength, initial | 0 |
| Gel strength, 10 minutes | 8 |
| pH | 10 |
| API filtrate | 3.8 |
| Cake thickness | 2/32 |
| Cl ion, p.p.m. | 3630 |
| Ca ion, p.p.m. | 40 |

When 5 sacks of cement were added along with 38.2 gallons of water per barrel of drilling fluid, a compressive strength of 115 p.s.i. developed on curing for 24 hours at 100° F. The addition of 5 pounds of the following additives to the above mixtures gave the following respective results when cured under the same foregoing conditions:

| | P.s.i. |
|---|---|
| Sodium meta-silicate | 160 |
| Calcium sulfate | 195 |
| Aluminum sulfate | 195 |
| Sodium dichromate | 137 |
| Calcium hypochlorite | 147 |

*Example 26*

A well was drilled in Andrews County, Texas, to a depth of 9,975 feet using a drilling mud. During the drilling process the fluid had additions of fresh water, soda ash, bentonite and carboxy-methyl-cellulose in a 10:1 ratio, and oil. The drilling fluid also possessed the following characteristics:

| | |
|---|---|
| Solids content, percent by weight | 13.1 |
| Solids content, percent by volume | 3 |
| Weight, lbs./gal. | 9.0 |
| Marsh funnel viscosity, sec. | 43 |
| Viscosity, centipoises | 16 |
| Gel strength, initial | 0 |
| Gel strength, 10 min. | 5 |
| API filtrate | 6 |
| Cake thickness | 1/32 |
| pH | 7 |
| Oil content, percent by volume | 4 |
| Cl ion, p.p.m. | 1300 |

When five sacks of cement were added along with 43 gallons of water and 5 pounds of calcium sulfate per barrel of drilling fluid, a compressive strength of 130 p.s.i. developed on curing for 24 hours at 100° F.

The following respective results were also obtained under the same conditions when using the listed additives in the amounts indicated:

| | Lbs. | P.s.i. |
|---|---|---|
| Sodium meta-silicate | 5 | 115 |
| Aluminum sulfate | 5 | 120 |
| Calcium chloride and | 5 | 115 |
| Sodium meta-silicate Calcium hypochlorite | 5 10 | 117 |

A compressive strength of 380 p.s.i. was obtained when using 2.5 gallons of D Brand sodium silicate with 5 sacks of cement and 22 gallons of water and upon curing for 24 hours at 180° F. The same amount of cement and water without any additive per barrel of mud resulted in a compressive strength of 350 p.s.i. after 24 hours at 140° F.

*Example 27*

A well was drilled in Andrews County, Texas, to a depth of 12,424 feet using a drilling mud. During the drilling process the fluid had additions of fresh water, starch, soda ash, bentonite and carboxy-methyl-cellulose in an 8 to 1 ratio, and oil. The drilling fluid also possessed the following characteristics:

| | |
|---|---|
| Solids content, percent by weight | 28.1 |
| Solids content, percent by volume | 5.0 |
| Weight, lbs./gal. | 9.1 |
| Marsh funnel viscosity, sec. | 48 |
| Viscosity, centipoises | 22.5 |
| Gel strength, initial | 2 |

| | | |
|---|---|---|
| API filtrate | | 8 |
| Cake thickness | | 1/32 |
| pH | | 8.1 |
| Oil content, percent by volume | | 4.5 |
| Ca ion, p.p.m. | | 320 |
| NaCl, p.p.m. | | 2600 |

When 5 sacks of cement were added, along with 33.8 gallons of water and 5 pounds of sodium metasilicate per barrel of drilling fluid, a compressive strength of 195 p.s.i. developed on curing for 24 hours at 100° F.

The following respective results were also obtained under the same conditions when using the listed additives in the amounts indicated:

| | Lbs. | P.s.i. |
|---|---|---|
| Calcium sulfate | 5 | 170 |
| Aluminum sulfate | 5 | 170 |
| Sodium dichromate | 5 | 153 |
| Calcium hypochlorite | 5 | 142 |

*Example 28*

A well was drilled in Ector County, Texas, to a depth of 6,130 feet using a drilling mud. During the drilling process the fluid had additions of brine water, strata fiber, crude oil (4 percent by volume), mica, soap and starch. The drilling fluid also possessed the following characteristics:

| | |
|---|---|
| Weight, lbs./gal | 10.8 |
| Marsh funnel viscosity, sec. | 46 |
| Sand content, percent | 0.8 |
| API filtrate, ml. | 32 |
| Cake thickness | 3/32 |
| Cl ion, p.p.m. | 195,500 |
| Ca ion, p.p.m. | light |
| Sulfate ion, p.p.m. | heavy |

When the following amounts of cement and water were added per barrel of above drilling mud, the following indicated compressive strengths were obtained after curing at 100° F. and at 1500 p.s.i.

| Sacks Cement | Gallons Water | One Day Strength | Three Day Strength |
|---|---|---|---|
| 2.5 | 3.45 | 405 | 489 |
| 4.0 | 11.07 | 771 | 1,069 |
| 5.0 | 16.8 | 905 | 1,215 |

*Example 29*

A well was drilled in Ector County, Texas, to a depth of 880 feet using a surface native mud to which was added 20 sacks of bentonite and fresh water.

When the following amounts of cement and water were added per barrel of above drilling mud, the compressive strengths listed below were obtained after curing at 100° F. and at 1500 p.s.i.

| Sacks Cement | Gallons Water | One Day Strength | Three Day Strength |
|---|---|---|---|
| 2.5 | 4.57 | 271 | 337 |
| 4.0 | 14.50 | 474 | 682 |
| 5.0 | 22.10 | 540 | 721 |

The foregoing examples illustrate the operability of this invention based on a very wide variety of drilling fluids or drilling muds. The compositions of the muds vary considerably, both as to materials added externally and from within the wells themselves, taken as they are from wells at widely different depths and from different geographical locations. However, all of the drilling fluids or muds which are employed in the preparation of the slurries of this invention are characterized by having at least some percentage, such as at least about 3% by volume or about 10% by weight, of solid materials as part of their composition. Muds having at least 25% solid materials by weight are preferred. The muds are all also further characterized by having densities or specific gravities greater and preferably substantially greater than that of water, and by being fairly viscous in nature. The muds also generally have a pH which is strongly basic. Other characteristics of the muds employed or which may be employed in preparing the slurries of this invention will be apparent from an analysis of the examples, wherein the properties are set forth and were determined by procedures recognized in the art.

As previously stated, the particular additives or formulations which are employed or techniques which are adopted in order to form a suitable slurry for cementing purposes will vary depending upon the composition of the starting drilling fluid material, the strength desired or sought for the final "set" product, etc. Sometimes additives will be employed and sometimes not. Water will generally, but not always, have to be added to make a pumpable slurry. When its use is necessary or advantageous, the amount of it employed may generally be widely varied. The type and amount of additive used, if employed, will also vary widely depending upon the above factors, but those employed in the various examples have been found particularly suitable.

The types of cement employed in the present invention and their amounts may also be varied depending upon the final product strength desired. About 5 sacks of cement each weighing about 94 pounds per barrel of mud is generally preferred but this amount may frequently be varied from about 2 to about 10 sacks. Hydraulic cements are generally preferred.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, pozzolan cements, natural cements, calcium sulfate or gypsum cements (such as plaster of Paris) and Portland cements. Pozzolan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements. In addition to the ordinary construction grades of Portland cement or other hydraulic cements, modified hydraulic cements and Portland cements designated as high-early-strength cement, heat-resistant cement, and slow-setting cement may be used in the present invention.

The compositions of the slurries of this invention are also formulated with consideration given to the depth of the well or borehole to be cemented and the consequent pressure and temperature conditions therein to be encountered. The elevated temperatures and pressures encountered in deep wells will generally cause an increase in the compressive strengths of the "set" slurry compositions of this invention as is evident from the examples and generally also accelerate the setting time of these compositions. It may therefore sometimes be necessary to select suitable retarders or accelerators for employment with the slurry compositions of this invention, in order to adapt the compositions to the particular conditions to be encountered.

It is believed that the techniques of this invention make possible the conversion of any type of drilling fluid or drilling mud, having characteristics such as previously described, into slurry mixtures suitable for cementing oil well casings, as well as for other purposes. However, the conversion of drilling muds which have substantial percentages of gypsum as part of their compositions is particularly effective. As indicated in the examples, this type of fluid has been found to be convertible into suitable slurries which possess outstandingly high compressive strengths when set. They are also convertible by a large number of processing variations in order to accomplish same. In other words their successful conversion is very flexible with respect to the particular additives or setting agents which may be employed in their conversion. They may sometimes be converted without employing any setting agents, or if setting agents are required, many different types of same may be employed, and in varying amounts, in order to successfully convert the drilling mud. The amount of cement necessary for satisfactory conversion of "gyp-type" drilling muds is also generally less stringent than for the conversion of other types of muds of this invention.

As previously indicated, several materials or additives are useful in assisting the conversion of the drilling muds into suitable slurries for cementing purposes. The examples show most of the preferred additives but some additives which may be employed are not shown in the examples. Thus salts of copper, iron and zinc frequently may be used and are effective in precipitating out excess quantities of tannins. Or, oxidizing agents, such as sodium dichromate are frequently effective in destroying this type of material, especially at high temperatures, or at least rendering them harmless.

An important feature of this invention is that slurries obtained by adding cement, water and other agents to drilling fluids are more compatible with the unaltered drilling fluid which must precede and follow the slurry as it is pumped down the hole. Less deterioration of the slurry results, along with less stiffening of the drilling fluid, and less channeling through the set cement than occurs when conventional cementing slurries are employed.

Facilities are generally available at a drilling rig or on cementing trucks to mix together the components described in this disclosure. They may involve screw conveyors for solid materials, hoppers and jet pumps, as are well known in the art. It is frequently desirable, to avoid very viscous mixtures, to first mix the mud with the required quantity of water before the addition of cement.

We claim as our invention:

1. The process of securing in place a string of pipe in a borehole, which comprises mixing aqueous drilling mud with sufficient hydraulic cement to provide the desired strength after the mixture slurry has set, pumping the mixture slurry down the string of pipe and up the annular space between the string of pipe and the walls of the drilled borehole, and allowing the mixture slurry to set.

2. The process of securing in place a string of pipe in a borehole, which comprises mixing aqueous drilling mud with sufficient hydraulic cement to provide the desired strength after the mixture slurry has set, pumping the mixture slurry down the string of pipe and up the annular space between the string of pipe and the walls of the drilled borehole, and allowing the mixture slurry to set; said aqueous drilling mud being fairly viscous and possessing at least 10 percent solid materials by weight and a specific gravity substantially greater than that of water.

3. The process of securing in place a string of pipe in a borehole, which comprises mixing aqueous drilling mud with sufficient hydraulic cement to provide the desired strength after the mixture slurry has set and with sufficient water to render the mixture slurry pumpable, pumping the slurrry mixture down the string of pipe and up the annular space between the string of pipe and the walls of the drilled borehole, and allowing said slurry mixture to set.

4. The process of securing in place a string of pipe in a borehole, which comprises making a mixture slurry of aqueous drilling mud, hydraulic cement, water and an additive selected from the group consisting of calcium sulfate, calcium chloride, sodium metasilicate, aluminum sulfate, sodium silicate, ferrous sulfate, sodium dichromate and calcium hypochlorite and mixtures of same, pumping the mixture slurry down the string of pipe and up the annular space between the string of pipe and the walls of the drilled borehole, and allowing said slurry to set.

5. The process of claim 1 wherein between about 2 and about 10 sacks of hydraulic cement each weighing about 94 pounds are employed with each barrel of drilling mud.

6. The process of claim 3 wherein between about 2 and about 10 sacks of hydraulic cement each weighing about 94 pounds are employed with each barrel of drilling mud.

7. The process of claim 4 wherein between about 2 and about 10 sacks of hydraulic cement each weighing about 94 pounds are employed with each barrel of drilling mud.

8. The process of claim 1 wherein said drilling mud is basic and contains substantial amounts of gypsum.

9. The process of claim 1 wherein said drilling mud comprises materials ground up by the well drill as well as materials which have been added to the well during the process of drilling.

10. The process of claim 4 wherein said drilling mud comprises materials ground up by the well drill as well as materials which have been added to the well during the process of drilling.

References Cited by the Examiner

UNITED STATES PATENTS

| | | | |
|---|---|---|---|
| 2,213,039 | 8/40 | Davis | 166—29 |
| 2,279,262 | 4/42 | Edwards | 166—29 |
| 2,526,674 | 10/50 | Larsen | 106—97 |
| 2,705,050 | 3/55 | Davis et al. | 166—31 |
| 2,776,112 | 1/57 | Ilfrey et al. | 175—64 |
| 2,801,077 | 7/57 | Howard et al. | 166—29 |
| 2,868,295 | 1/59 | Brooks et al. | 166—29 |

OTHER REFERENCES

Gatlin, C.: Petroleum Engineering, Drilling and Well Completions. N.J., Prentice-Hall, 1960, pages 81, 273 and 275.

CHARLES E. O'CONNELL, *Primary Examiner.*

BENJAMIN BENDETT, *Examiner.*